Sept. 13, 1932.  A. TEVES  1,877,081

FLUID PRESSURE BRAKE

Filed July 12, 1929

Inventor
Alfred Teves,
Francis O. Hardesty,
Attorney.

Patented Sept. 13, 1932

1,877,081

UNITED STATES PATENT OFFICE

ALFRED TEVES, OF FRANKFORT-ON-THE-MAIN, GERMANY

FLUID PRESSURE BRAKE

Application filed July 12, 1929, Serial No. 377,683, and in Germany November 12, 1928.

The present invention relates to fluid pressure or so-called "hydraulic" brakes and more particularly to heavy duty brakes for trucks or other very heavy vehicles.

In very heavy vehicles such as trucks it is common practice to use wheels of a size not greatly in excess of those used on lighter vehicles and therefore, because of the space available, the problem of providing sufficient braking surface and pressure becomes sometimes a difficult one to solve. One of the aspects of the problem is the size of cylinder required to operate the brakes and the space in which it is to be accommodated.

Among the objects of the present invention is to overcome this latter difficulty and provide pressure applying means which shall be ample and yet not require much space for mounting.

Other objects will readily occur to those skilled in the art upon reference to the following description and the accompanying drawing in which Fig. 1 is a vertical section of a part of a wheel and brake with the section of the pressure means on line 1—1 of Fig. 3.

Figure 1:
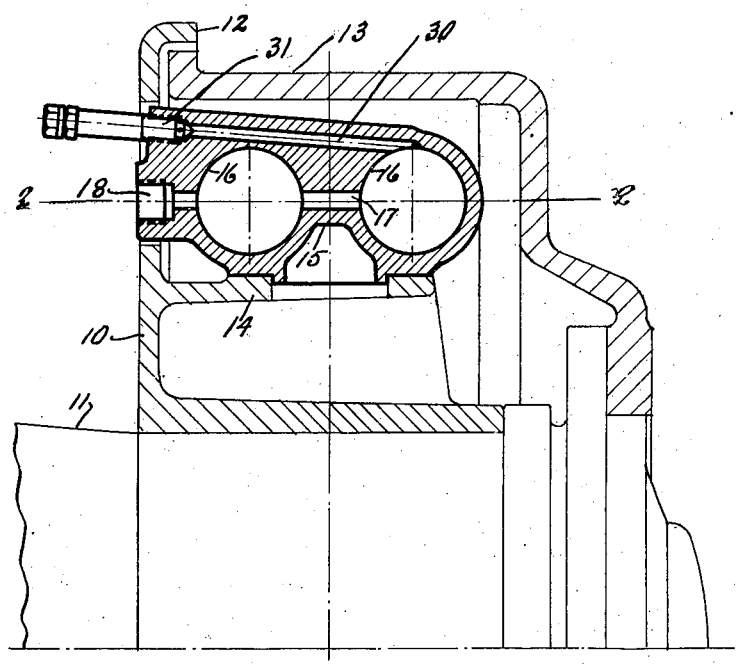
Figures 2, 3:
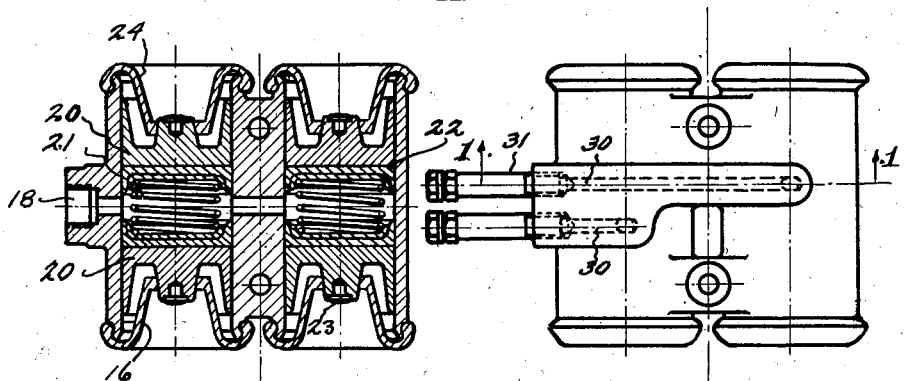
Fig. 2 is a section on line 2—2 of Fig. 1.
Fig. 3 is a plan view of the device.

In the drawing, the brake anchor plate is shown at 10 as mounted upon the axle housing 11 and as flanged at its outer edge 12 to provide means for preventing entrance of dirt to the brakes inside of a conventional braking flange or drum 13.

Carried upon anchor plate 10 on a suitable bracket portion 14 is a braking motor comprising a cylinder block 15, containing for example two cylinders 16 with their axes parallel and which are open at both ends and communicate at their central portions by a passage 17, one of the cylinders also having a fluid inlet as at 18.

The cylinder axes are in a plane parallel to the axis of the axle housing and therefore of the brake drum. Further, the cylinder block may occupy substantially the entire cross section of the annular space available.

Mounted within each cylinder is a pair of oppositely acting pistons 20, held apart by a spring 21 so that fluid from inlet 18 and passage 17 may enter the space between. Each piston is provided with a suitable flexible cup 22 held against its inner end by spring 21 to provide against leakage while the outer end of the piston is provided with a wear resisting element 23 and adapted to contact with a suitable portion of a brake shoe of any suitable form. There is also secured over the outer end of each piston and cylinder a flexible cover piece 24 to exclude dust and dirt.

In order to permit proper filling of the brake system with a suitable fluid, each cylinder may be provided with a separate bleeder 30 leading from the normally highest level therein and controlled each by a separate valve 31.

In the operation of the device, fluid under pressure is supplied to the inlet 18 and of course forces apart the pistons 20 in both or all the cylinders with even pressure.

Now, having described the invention and the preferred forms of embodiment thereof, it is to be understood that the said invention is to be limited, not to the specific details herein described and illustrated, but only by the scope of the claim which follows:—

I claim:—

The combination with an axle housing and a brake drum having an annular braking flange providing an annular space between the housing and the flange, a braking motor between the housing and flange and having a dimension radially of the drum approximating the radial width of the annular space so as to occupy substantially an entire cross section of the available annular space, the motor having a plurality of adjacent piston receiving bores whose axes are parallel and are in a plane parallel to the axis of the axle housing.

In testimony whereof I affix my signature.

ALFRED TEVES.